United States Patent [19]

Kauka

[11] Patent Number: 5,284,198
[45] Date of Patent: Feb. 8, 1994

[54] GUIDE MECHANISM FOR WINDOW SHADE

[75] Inventor: Christof Kauka, Cologne, Fed. Rep. of Germany

[73] Assignee: Gebr. Happich GmbH, Fed. Rep. of Germany

[21] Appl. No.: 904,825

[22] Filed: Jun. 26, 1992

[30] Foreign Application Priority Data

Jun. 29, 1991 [DE] Fed. Rep. of Germany ....... 4121623

[51] Int. Cl.⁵ .............................................. E04F 10/06
[52] U.S. Cl. .................................. 160/70; 160/370.2 R
[58] Field of Search .................... 160/66, 370.2, 69, 70, 160/79, DIG. 2, DIG. 3, DIG. 4

[56] References Cited

U.S. PATENT DOCUMENTS

| | | | |
|---|---|---|---|
| 1,309,133 | 7/1919 | Harrold | 160/370.2 X |
| 1,441,487 | 1/1923 | Doner . | |
| 1,442,255 | 1/1923 | Doner . | |
| 1,681,292 | 8/1928 | Glover | 160/70 X |
| 1,727,670 | 9/1929 | Pettit et al. | 160/70 |
| 1,794,771 | 3/1931 | Huffman | 160/DIG. 3 X |

FOREIGN PATENT DOCUMENTS 1756994  9/1957  Fed. Rep. of Germany .

Primary Examiner—David M. Purol
Attorney, Agent, or Firm—Ostrolenk, Faber, Gerb & Soffen

[57] ABSTRACT

A window shade particularly for use with a motor vehicle window including a shade supported at one edge by a winding shaft and a pull strip located at the other edge of the shade for unwinding the shade from the winding shaft. For guiding the movement of the shade onto and off the winding shaft, a guide device comprised of two pairs of toggle links is provided. Each pair of toggle links is attached by a pivot connection at one end. The opposite end of one toggle link is pivotably attached to a fixed location. The opposite end of the other toggle link is pivotably attached to the pull strip. A strut extends between the pivot locations where the two pairs of toggle link arms are connected. Each toggle link arm is connected to the strut at a main pivot and at a second location and the strut is slotted to receive both connections from each link arm and to permit the toggle links connections to move through an arcuate pathway as the pull strip is moved. At least one of the toggle link arms may be braked, resisting winding and unwinding of the shade.

7 Claims, 3 Drawing Sheets

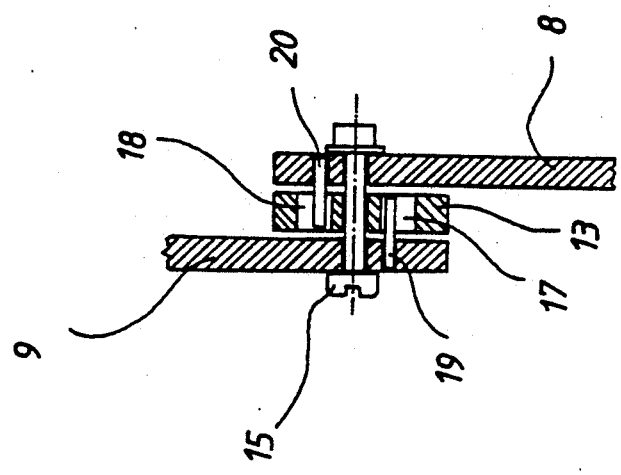
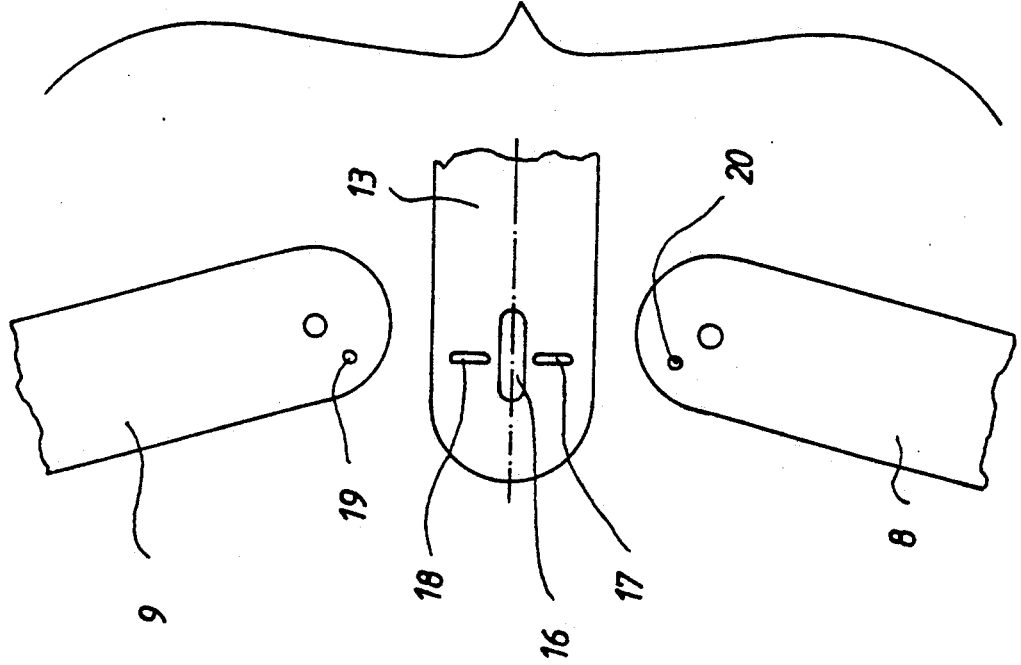

GUIDE MECHANISM FOR WINDOW SHADE

BACKGROUND OF THE INVENTION

The present invention relates to a window shade, particularly for automotive vehicles, having a winding shaft with a spring device tensioned in the rolling up direction. One edge of the shade is fastened to the shaft while its other edge is fastened to a graspable pull strip.

A window shade of this type is shown in Federal Republic of Germany Utility Model 79 02 405. In that known window shade, telescopic swing struts are provided for the opening and closing of the shade.

U.S. Pat. No. 1,441,487 shows a window shade of the present type which is useful for cars. This known window shade has a winding shaft which has spring means pretensioned in the rolling up direction. One edge of the shade is fastened to the shaft. The other edge is fastened to a pull strip. Between the winding shaft and the pull strip there is a guide mechanism which acts in the plane of the pulled down shade. That mechanism includes two pairs of toggle-like link arms. The free arms of both pairs of link arms are fastened for swinging around one of their ends to stationary parts of the car and at their other ends to the pull strip. In this known shade, particularly when the force is introduced eccentrically, there is no assurance that the movement down and up of the shade will always take place at right angles to the winding shaft. The same comments apply to the window shade shown and described in U.S. Pat. No. 1,442,255.

SUMMARY OF THE INVENTION

The object of the present invention is to provide a window shade which takes up very little space for installation and in which the directions of opening and closing of the shade are perpendicular to the winding shaft and which assures parallel opening and closing of the shade even when force is applied eccentrically.

This object is achieved by the invention because between the winding shaft and the pull strip there is a guide mechanism for guiding the opening and the closing of the shade. The mechanism includes two pairs of toggle-like link arms. The pairs are spaced apart across the width of the shade. A strut connects the toggles of the pairs of link arms to each other. The placement of the toggles and the strut causes the strut to extend parallel to the winding shaft and the pull strip.

In each of the pairs of links, the two arms are swingably fastened to each other at one of their ends. The free ends of one of the links of each pair are fastened in a swingable manner on a stationary part of the car or on bearing pedestals which also receive and support the winding shaft. The free ends of the other of the links of each pair are swingably attached to the pull strip.

Guide means are provided in the region of the toggles in order to assure parallel displacement of the pull strip perpendicular to the winding shaft upon the opening and closing of the shade. The guide means include a strut extending between the pairs of links, and particularly between the attached ends of each pair of links, so that movement of the link pairs is coordinated.

The window shade of the invention is characterized by a compact construction which is easy and economical to manufacture and by simple and reliable operation.

In a preferred feature of the invention, each of the end regions of the strut has a first slot in it which extends in the longitudinal direction of the strut and has two further transverse slots which are directed perpendicular to the first slot. One further transverse slot is located above the first slot and the other is below it. The first slot is passed through by a pivot pin which connects the link arms and the strut together in the manner of a toggle. One additional pin seated on the lower link arm and one seated on the upper link arm engage in a respective one of the two transverse slots. These measures assure that the arms of the pairs of link arms are moved synchronously upon the opening and closing of the shade and that the pull strip only can be displaced perpendicular to the winding shaft and not in the axial direction of that shaft. The parallel function desired upon the actuation of the window shade is thus assured.

In a further development of the invention, a brake which may be adjustable or resettable, can be arranged in the region of parts of the guide mechanism which move towards each other, such as at the toggles. The brake prevents unintended winding up of the shade. The brake may be a simple friction brake, for instance, in the form of a felt disk arranged between two articulated parts, which can be provided for practical use of the shade.

The window shade may be substantially concealed by the roof covering of a car and may be above a side window in the car. Arranging the new window shade specifically over a side window of the car is advantageous, since a swingable sun visor would be disadvantageous due to the limited amount of space generally available there.

The pull strip can also have a profile which is conducive to its being grasped. As a result, provision of a separate grip is unnecessary.

Other objects and features of the invention are described below with reference to one embodiment shown in the drawings.

BRIEF DESCRIPTION OF THE DRAWINGS

FIG. 3 shows a detail of the window shade in an exploded view;

FIG. 4 shows a detail of FIG. 3 in an assembled condition.

DESCRIPTION OF THE PREFERRED EMBODIMENT

Figure 1:
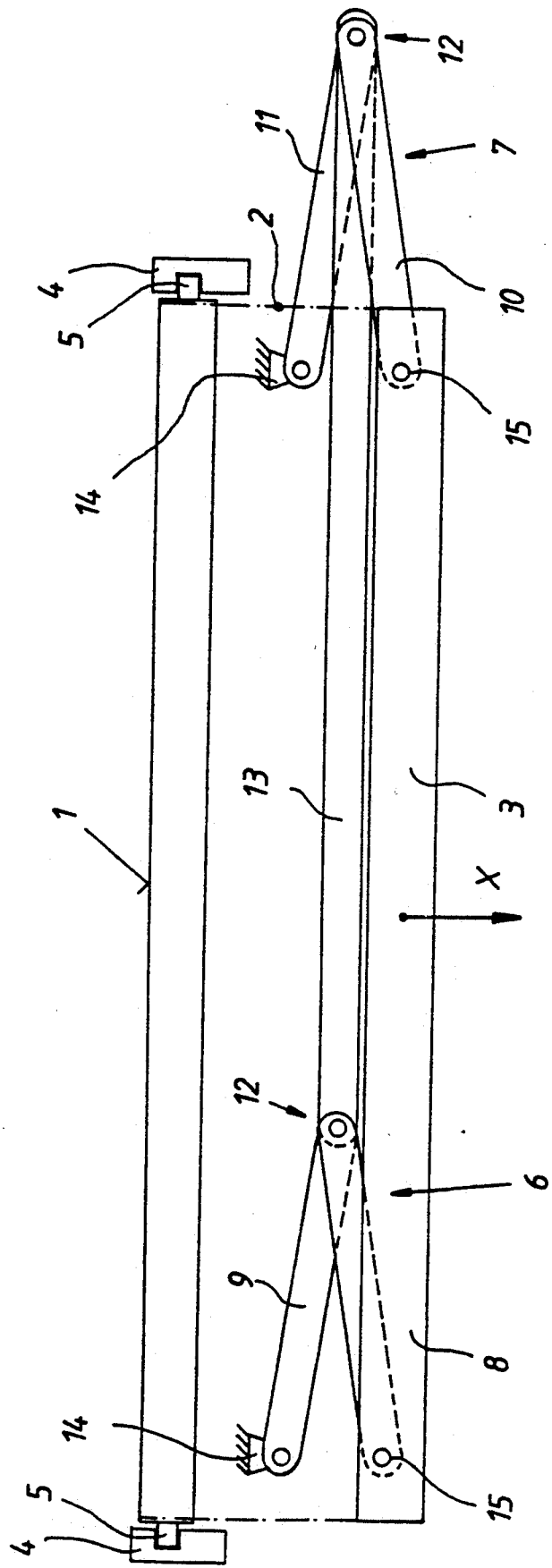
FIG. 1 shows a window shade of the invention with the shade retracted.

The window shade of the invention comprises a winding shaft 1 on and off which a window shade 2 is wound. The shade is moved using a pull strip 3. A guide mechanism guides that motion The winding shaft 1 includes a conventional spring device which is tensioned in the winding up direction. The shaft has journal pins 5 at its ends, which are received in bearing pedestals 4 fixed on the vehicle body. The winding shaft 1 can alternatively be arranged in a housing which includes the bearing pedestals 4 or comparable supports for the journal pins. The top edge of the shade 2 is fastened to the winding shaft 1. The bottom edge of the shade is fastened to the rigid pull strip 3. Vertical movement of the pull strip 3 in the direction indicated by the arrow X brings the shade 2 from the position of non-use shown in FIG. 1 into a position of use shown in FIG. 2.

The guide mechanism guides the transfer of the shade from the one position into the other. The guide mechanism comprises two toggle like pairs 6 and 7 of link arms, the pair 6 having the link arms 8 and 9 and the pair 7 having the arms 10 and 11 respectively, and comprises a strut 13 which connects the respective toggle joints 12 at the respective linked ends of the pairs 6, 7 of link arms to each other and extends across the shade parallel to the winding shaft 1 and to the pull strip 3. The free ends of one of the link arms 9 and 11 of each of the pairs 6 and 7 are both pivoted on stationary parts 14 of the car or on the bearing pedestals 4 which receive the winding shaft 1. The free ends of the other link arms 8 and 10 of each of the pairs 6 and 7 are fastened swingably to the pull strip 3. For the pivoting connections of the link arm pairs at the points 12, a pivot pin 15, or a screw, rivet, or the like provided. This also forms the toggle joints.

As can be noted particularly from FIGS. 3 and 4, each of the two opposite end regions of the strut 13 has a first horizontal slot 16 which extends in the longitudinal direction of the strut and has two further transverse slots which are directed perpendicular to the first slot, namely a lower transversal slot 17 below the first slot 16 and an upper transversal slot 18 disposed above slot. The slots 17 and 18 extend in the direction across the strut. Each first slot 16 is traversed by the respective pivot pins 15 which connect the link arms 8 and 9 and the link arms 10 and 11, respectively, with the ends of strut 13 in a toggle like manner. A pin 19 is seated on each of the upper link arms 9 and 11 on a side of the opening in the respective link arm which receives the pivot pin 15. A pin 20 is seated on each of the lower link arms 8 and 10 on the side of the opening in the respective link arm for receiving the pin 15. The pin 19 from the upper link arm is received in the lower slot 17. The pin, 20 extending from the lower link arm is received in the upper slot 18. These connections of the link arms and the strut 13 provides positive guidance for the pairs 6 and 7 and of the link arms and for the pull strip 3. The strip 3 is moveable only perpendicularly with respect to the winding shaft 1 and only remains parallel to the shaft. Upon movement of the shade up or down, the toggle joints 12 move along an arcuate path, caused by only the pull strip 3 moving while the winding shaft is stationary and by the toggle action. To accommodate the arcuate path, an equalization of length is necessary, and that equalization is provided by the slots 16 as well as the slots 17 and 18.

Figure 2:
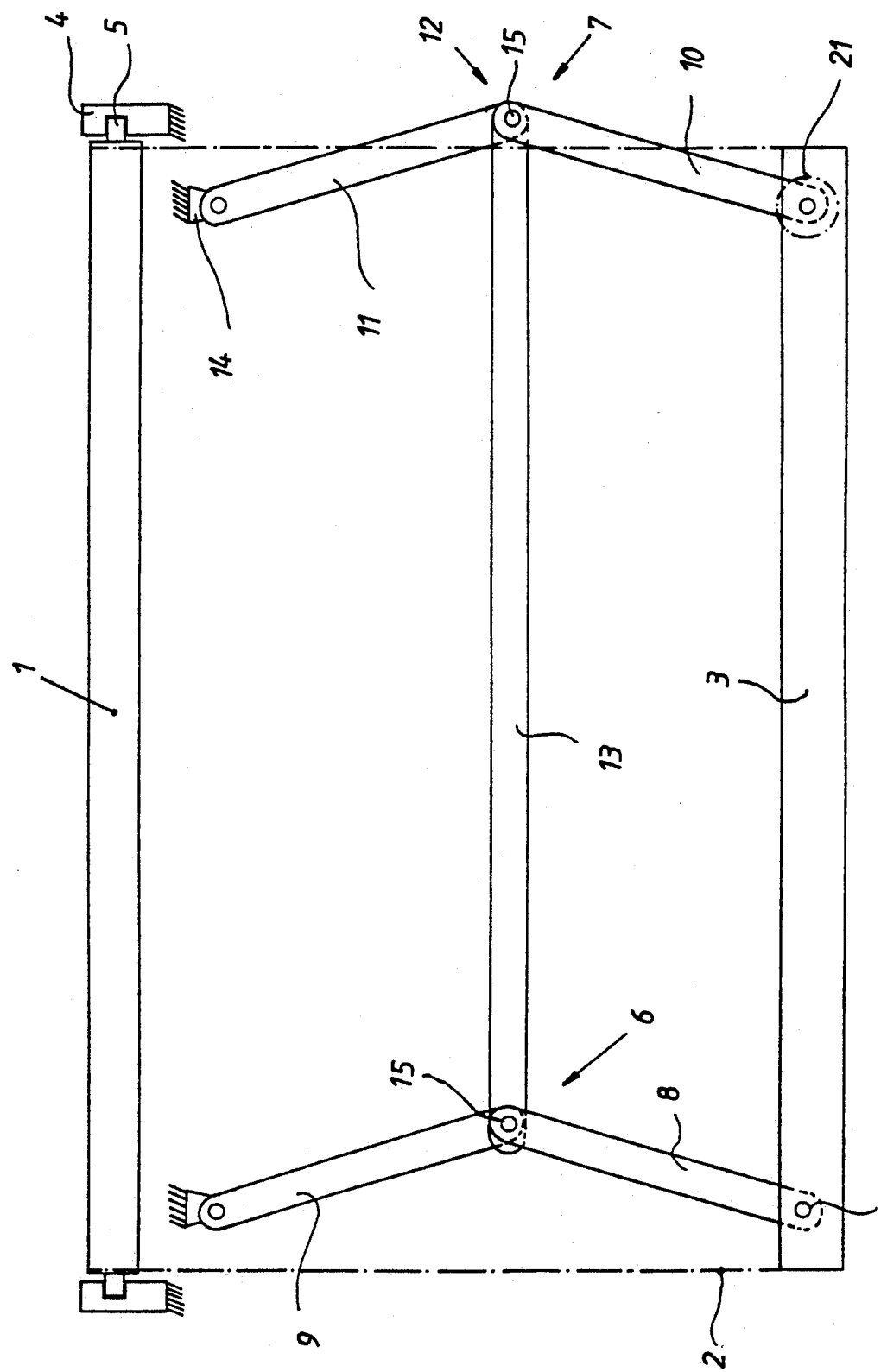
FIG. 2 shows the window shade with the shade extended.

In FIG. 2 a disk 21 of friction increasing material, indicated by a dash-dot line, is provided at a movement or bearing point of a toggle link arm. The disk serves as a brake to counter unintended winding up of the shade 2. Such a disk may be placed at any bearing point at which parts move relatively.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A window shade, comprising:
    a winding shaft and means supporting the winding shaft for rotation in an unwinding direction and a winding direction;
    a shade having one edge which is fastened to the shaft so that the shade is wound onto the shaft from the one edge; the shade having an opposite edge, a pull strip fastened on the opposite edge of the shade, such that pulling on the pull strip pulls on the shade and unwinds the shade from the winding shaft;
    a guide mechanism adapted for acting in the plane of the shade being pulled down, the guide mechanism being arranged between the pull strip and a fixed support for the window shade; the guide mechanism comprising a first and a second pair of toggle-like link arms, the pairs of link arms being spaced apart in the direction transverse to movement of the shade; the two arms of each respective pair of link arms having first ends which are swingably connected to each other for enabling the arms to pivot with respect to each other; one of the link arms of each pair having a second end spaced from the first end thereof, and the second end of each one arm being swingably fastened to a stationary part; the other link arm of each pair having a third end spaced from the first end thereof, the third end being swingably fastened to the pull strip to pivot with respect to the pull strip, whereby as the shade is unwound or wound, the link arms of each pair respectively pivot apart and toward each other;
    the guide mechanism further comprising a strut having opposed ends which is pivotably connected to and extends between the pivotably connected first ends of each pair of toggle link arms and which extends in the direction transverse to movement of the pull strip, wherein, upon movement of the pull strip to selectively unwind or wind the shade on the winding shaft, the guide mechanism causes the pull strip to remain parallel with the winding shaft.

2. The window shade of claim 1, wherein the connection between the strut and the link arms of each pair of link arms includes fastening means which permit the connected first ends of each of the pair of link arms to move along an arcuate pathway during upward and downward movement of the shade.

3. The window shade of claim 2, wherein the means connecting the strut and the link arms comprises a first slot extending in the longitudinal direction of the strut and located at each of the ends of the strut where the first ends of each pair of link arms are connected, the first ends of each of the pairs of link arms being connected by a respective pivot pin and the respective pivot pin for each pair of link arms being received in the respective slot located in each of the ends of the strut for the respective pair of link arms, whereby the respective pivot pin connects each pair of link arms with the strut;
    a respective second slot located above each of the first slots and extending perpendicular thereto;
    a respective third slot located below each of the first slots and extending perpendicular thereto; and
    a respective first pin disposed on each of the link arms and received in one of the respective second or third slots.

4. The window shade of claim 3, wherein one of the link arms of each pair is normally inclined to extend primarily above the first slot; the other of the link arms of each pair is inclined to extend primarily below the first slot; the respective first pin on the one link arm being engaged in the third slot and the respective first pin on the other link arm being engaged in the second slot.

5. The window shade of claim 1, further comprising a spring device disposed in the winding shaft for normally biasing the winding shaft in the winding direction.

6. The window shade of claim 1, further comprising a brake disposed on at least one of the toggle links for braking the movement of the winding shaft.

7. The window shade of claim 6, wherein the brake comprises friction increasing material disposed on the at least one toggle link.

* * * * *